United States Patent
Shimizu et al.

(10) Patent No.: US 9,792,930 B1
(45) Date of Patent: Oct. 17, 2017

(54) MICROWAVE-ASSISTED MAGNETIC RECORDING HEAD AND MAGNETIC RECORDING AND REPRODUCING DEVICE

(71) Applicant: KABUSHIKI KAISHA TOSHIBA, Tokyo (JP)

(72) Inventors: Mariko Shimizu, Kanagawa (JP); Katsuhiko Koui, Kanagawa (JP); Shuichi Murakami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/445,857

(22) Filed: Feb. 28, 2017

(30) Foreign Application Priority Data

Sep. 23, 2016 (JP) .................. 2016-185465

(51) Int. Cl.
*G11B 5/127* (2006.01)
*G11B 5/31* (2006.01)
*G11B 5/00* (2006.01)

(52) U.S. Cl.
CPC .......... *G11B 5/3133* (2013.01); *G11B 5/1278* (2013.01); *G11B 5/3146* (2013.01); *G11B 2005/0024* (2013.01)

(58) Field of Classification Search
CPC ....... G11B 5/31; G11B 5/3133; G11B 5/3146; G11B 5/127; G11B 5/1278; G11B 2005/0024
USPC .................. 360/125.1, 125.2, 125.3–125.35
See application file for complete search history.

(56) References Cited

U.S. PATENT DOCUMENTS

| 7,724,469 | B2 | 5/2010 | Gao et al. |
| 8,379,352 | B1 | 2/2013 | Braganca et al. |
| 8,537,497 | B2 * | 9/2013 | Nagasaka ............... H01L 43/08 |
| | | | 360/125.3 |
| 8,922,949 | B1 * | 12/2014 | Koui ...................... G11B 5/235 |
| | | | 360/125.3 |
| 2013/0200446 | A1 | 8/2013 | Wunderlich et al. |
| 2015/0236246 | A1 | 8/2015 | Ishida et al. |

FOREIGN PATENT DOCUMENTS

JP 2008176908 A 7/2008

OTHER PUBLICATIONS

Shaojie Hu et al., "Efficient thermal spin injection using CoFeAl nanowire", NPG Asia Materials, 2014, pp. 1-5.

* cited by examiner

*Primary Examiner* — Allen T Cao
(74) *Attorney, Agent, or Firm* — Patterson & Sheridan, LLP

(57) ABSTRACT

A microwave-assisted magnetic recording head includes a main magnetic pole, an auxiliary magnetic pole facing the main magnetic pole with a gap therebetween, and a stacked-layer element disposed in the gap. The stacked-layer element includes, in the order from the main magnetic pole to the auxiliary magnetic pole, a thermal spin injection layer that is formed on the main magnetic pole, exchange-coupled with the main magnetic pole, and formed of a magnetic material of which spin-dependent Seebeck coefficient is negative, a first non-magnetic layer formed on the thermal spin injection layer, an oscillation layer formed on the first non-magnetic layer, a second non-magnetic layer formed on the oscillation layer, and a spin injection layer formed on the second non-magnetic layer.

20 Claims, 4 Drawing Sheets

US 9,792,930 B1

MICROWAVE-ASSISTED MAGNETIC RECORDING HEAD AND MAGNETIC RECORDING AND REPRODUCING DEVICE

CROSS-REFERENCE TO RELATED APPLICATION

This application is based upon and claims the benefit of priority from Japanese Patent Application No. 2016-185465, filed Sep. 23, 2016, the entire contents of which are incorporated herein by reference.

FIELD

Embodiments described herein relate generally to a microwave-assisted magnetic recording heads, and magnetic recording and reproducing devices.

BACKGROUND

In order to form a microwave-assisted recording head, it would be important to design and fabricate a spin-torque oscillator that can oscillate stably at a low drive current and generate an in-plane high-frequency magnetic field sufficient to resonate the magnetization of a magnetic recording medium.

The maximum density of a current that can be passed through the spin-torque oscillator is $2 \times 10^8$ A/cm$^2$ when an element size is about 70 nm, for example. At a current density higher than or equal to $2 \times 10^8$ A/cm$^2$, the spin torque oscillator may be compromised by heat generation and migration. For this reason, it is important to design a spin-torque oscillator that can oscillate at the lowest possible current density.

Conventionally, a spin injection layer is formed of a ferromagnet such as a Co/Ni artificial lattice. For example, in an element having a size of 40 nm by 40 nm, theoretically without interaction between the element and a magnetic pole, an oscillation layer of about 25 nmT can be made to start oscillating at about $0.5 \times 10^8$ A/cm$^2$. However, in an actual magnetic head, since the magnetization of the oscillation layer interacts with the magnetization of an auxiliary magnetic pole close to the oscillation layer in a magnetostatic manner, a current density necessary for the oscillation may become undesirably large.

DETAILED DESCRIPTION

Figure 1:
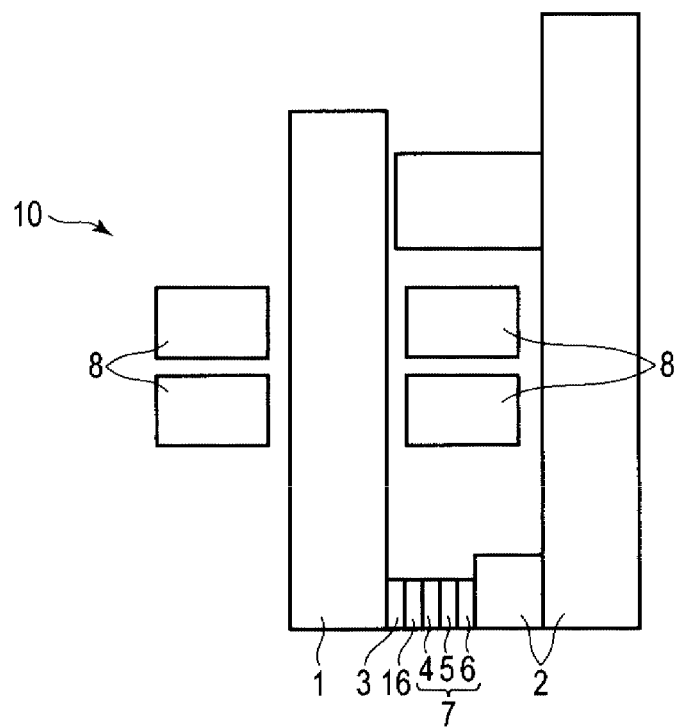
FIG. 1 is a cross-sectional view of a microwave assisted magnetic recording head according to a first embodiment.

An exemplary embodiment provides a microwave-assisted magnetic recording head having a spin-torque oscillator that can oscillate stably at a low drive current.

In general, according to an embodiment, a microwave-assisted magnetic recording head includes a main magnetic pole, an auxiliary magnetic pole facing the main magnetic pole with a gap therebetween, and a stacked-layer element disposed in the gap. The stacked-layer element includes, in the order from the main magnetic pole to the auxiliary magnetic pole, a thermal spin injection layer that is formed on the main magnetic pole, exchange-coupled with the main magnetic pole, and formed of a magnetic material of which spin-dependent Seebeck coefficient is negative, a first non-magnetic layer formed on the thermal spin injection layer, an oscillation layer formed on the first non-magnetic layer, a second non-magnetic layer formed on the oscillation layer, and a spin injection layer formed on the second non-magnetic layer.

A microwave-assisted magnetic recording head according to an embodiment includes stacked layers of a main magnetic pole that generates a recording magnetic field when a current is passed through a recording coil and applies the recording magnetic field to a magnetic recording medium, an auxiliary magnetic pole that is provided on the trailing direction side of the main magnetic pole, and (1) a spin-torque oscillator and a thermal spin injection layer exchange-coupled to the auxiliary magnetic pole, which are provided between the main magnetic pole and the auxiliary magnetic pole, or (2) a thermal spin injection layer exchange-coupled to the main magnetic pole and a spin-torque oscillator, which are provided between the main magnetic pole and the auxiliary magnetic pole.

The spin-torque oscillator which is used in the embodiment has a stacked-layer structure including a spin injection layer, a non-magnetic layer, and an oscillation layer. Moreover, the order in which the spin-torque oscillator and the thermal spin injection layer are stacked is as follows: the spin injection layer, the non-magnetic layer, the oscillation layer, a non-magnetic layer, and the thermal spin injection layer. For instance, as for the combination (1), the main magnetic pole, a non-magnetic under layer, the spin injection layer, the non-magnetic layer, the oscillation layer, the non-magnetic layer, the thermal spin injection layer, and the auxiliary magnetic pole can be stacked in this order. Furthermore, for instance, as for the combination (2), the main magnetic pole, the thermal spin injection layer, the non-magnetic layer, the oscillation layer, the non-magnetic layer, the spin injection layer, a non-magnetic cap layer, and the auxiliary magnetic pole can be stacked in this order.

The above-described non-magnetic under layer and non-magnetic cap layer are arbitrarily provided.

The thermal spin injection layer and the oscillation layer are stacked with a non-magnetic layer therebetween, which is formed of a non-magnetic substance. The non-magnetic layer is used to prevent the magnetization of the thermal spin injection layer and the magnetization of the oscillation layer from being exchange-coupled. If the magnetization of the thermal spin injection layer and the magnetization of the oscillation layer are exchange-coupled, the thermal spin injection layer functionally becomes part of the oscillation layer, which is not desirable.

Moreover, the non-magnetic under layer between the main magnetic pole and the spin injection layer plays the role of controlling the crystallinity of a layer above the spin injection layer and allows a selection to be made such that, for example, the perpendicular magnetic anisotropy of the spin injection layer can be obtained.

If the non-magnetic cap layer is provided between the spin injection layer and the auxiliary magnetic pole, machining damage to the spin injection layer can be reduced at the stage of formation of the spin-torque oscillator.

The thermal spin injection layer used in the embodiment is formed of a material whose spin-dependent Seebeck coefficient is negative and injects thermal spin into the oscillation layer by a temperature gradient between the thermal spin injection layer and the oscillation layer.

A magnetic head assembly according to the embodiment includes the above-described microwave-assisted magnetic recording head, a head slider on which the microwave-assisted magnetic recording head is mounted, a suspension with one end on which the head slider is mounted, and an actuator arm connected to the other end of the suspension.

A magnetic recording and reproducing device according to the embodiment includes the magnetic head assembly and a signal processing section that performs writing and reading of a signal to and from the magnetic recording medium by using the microwave-assisted magnetic recording head mounted on the magnetic head assembly.

According to the embodiment, by assisting magnetization oscillation of the oscillation layer of the spin-torque oscillator by using a thermal spin injection material for an interface layer of the main magnetic pole and providing a temperature gradient between the main magnetic pole and the oscillation layer by, for example, a dynamic flying height (DFH) control heater and a recording coil which are provided near the main magnetic pole, the microwave-assisted magnetic recording head can be driven at a low current density.

Hereinafter, embodiments will be described with reference to the drawings.

FIG. 1 is a cross-sectional view of a microwave-assisted magnetic recording head according to a first embodiment.

As depicted in FIG. 1, a magnetic recording head 10 includes a main magnetic pole 1 that generates a write magnetic field when a current is passed through a recording coil 8, an auxiliary magnetic pole 2 that is provided so as to face the main magnetic pole 1, a thermal spin injection layer 3 that is provided on a trailing direction-side surface of the main magnetic pole 1 and is exchange-coupled to the main magnetic pole 1, and a spin-torque oscillator 7 that is provided between the thermal spin injection layer 3 and the auxiliary magnetic pole 2. The spin-torque oscillator 7 has a stacking structure including an oscillation layer 4 provided on the thermal spin injection layer 3 with a non-magnetic layer 16 placed therebetween, a non-magnetic layer 5 provided on the oscillation layer 4, and a spin injection layer 6 provided on the non-magnetic layer 5. Moreover, the thermal spin injection layer 3 is formed of a material of which spin-dependent Seebeck coefficient is negative, such that thermal spin is injected into the oscillation layer 4 by a temperature gradient between the thermal spin injection layer 3 and the oscillation layer 4.

Hereinafter, each layer of the magnetic recording head of FIG. 1 will be described in more detail.

The thermal spin injection layer 3 is formed of a material of which spin-dependent Seebeck coefficient is negative. Here, the spin-dependent Seebeck coefficient is defined as a difference between a Seebeck coefficient for an upspin and a Seebeck coefficient for a downspin. Examples of the material of which spin-dependent Seebeck coefficient is negative include cobalt-based Heusler alloys such as $Co_2FeAl$, $Co_2FeSi$, $Co_2MnAl$, $Co_2MnSi$, and a $Co_2TiAl$ Heusler alloy. Furthermore, as the thermal spin injection layer 3, a material having positive perpendicular magnetic anisotropy can be used.

In order to generate a high-frequency magnetic field which is necessary for microwave magnetic field assisted recording, a product of the saturated magnetization Ms and the film thickness t of the oscillation layer 4 is desirably about 20 to 30 nmT.

As the oscillation layer 4, an FeCo alloy or an NiFe alloy, an alloy obtained by adding, to the FeCo alloy, at least one or more of elements which are selected from Al, Si, Ga, Ge, Cu, Ag, Au, Cr, Ta, W, Ir, Pt, and Pd, an FeCo/Ni artificial lattice, an Fe/Co artificial lattice, or the like is used. The size of the oscillation layer 4 is desirably about 70 nm or less per side.

As the non-magnetic layer 5, for example, Cu, Ag, and Au, which are large in spin diffusion length, can be used.

As the non-magnetic layer 16, for example, Cu, Ag, and Au, which are large in spin diffusion length, can be used.

As the spin injection layer 6, for example, a magnetic thin film with perpendicular magnetization formed of an FeCo/Ni artificial lattice, a Co/Pt artificial lattice, an FePt alloy, a CoPt alloy, or the like can be used. Moreover, at the interface on the side where the non-magnetic layer 5 is located, a material with high spin polarizability such as an FeCo alloy or a cobalt-based Heusler alloy can be further stacked.

Figure 2:
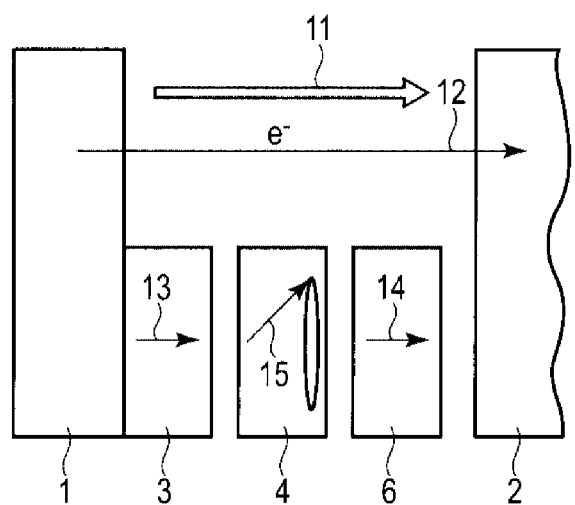
FIG. 2 depicts an example of an operation of the microwave assisted magnetic recording head according to the embodiment.

FIG. 2 illustrates an example of the operation of the microwave-assisted magnetic recording head according to the embodiment.

The oscillation layer 4 is disposed between the main magnetic pole 1 and the auxiliary magnetic pole 2. As indicated by an arrow 11, since a gap magnetic field is applied to the auxiliary magnetic pole 2 from the main magnetic pole 1 in a direction perpendicular to the film surface of the main magnetic pole 1, the magnetization of the thermal spin injection layer 13 and the magnetization of the spin injection layer 6 are in an almost parallel state as indicated by arrows 13 and 14, respectively. In this state, if a current is passed from the thermal spin injection layer 3 to the oscillation layer 4 and the spin injection layer 6 in a direction in which electrons flow in the direction of an arrow 12, the oscillation layer 4 oscillates by receiving, from the spin injection layer 6, spin torque which acts in a rotary direction as indicated by an arrow 15. Furthermore, if there is a temperature difference between the oscillation layer 4 and the main magnetic pole 1, spin torque is injected into the oscillation layer 4 from the thermal spin injection layer 3, whereby magnetization oscillation of the oscillation layer 4 can be assisted. If a material of which spin-dependent Seebeck coefficient is negative is used for the thermal spin injection layer 3, a downspin, that is, a spin in a direction in anti-parallel with magnetization is injected into the low temperature-side oscillation layer 4 from the high temperature-side main magnetic pole 1. For this reason, spin torque is considered to be applied efficiently.

Figure 3:
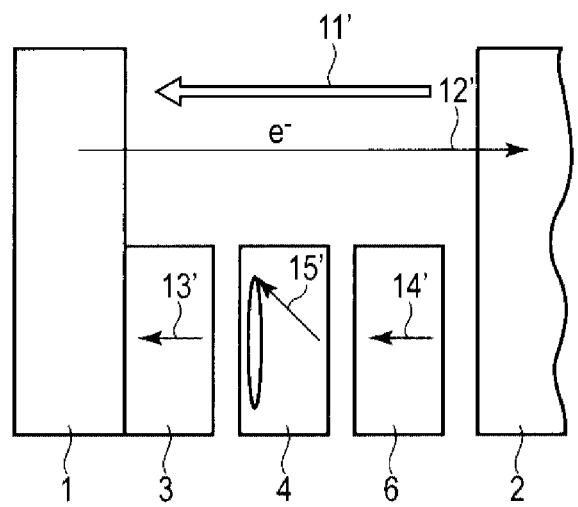
FIG. 3 depicts another example of the operation of the microwave assisted magnetic recording head according to the embodiment.

FIG. 3 illustrates another example of the operation of the microwave-assisted magnetic recording head according to the embodiment.

As depicted in FIG. 3, as indicated by an arrow 11', a gap magnetic field is applied to the main magnetic pole 1 from the auxiliary magnetic pole 2 in a direction perpendicular to the film surface of the auxiliary magnetic pole 2. The magnetization of the thermal spin injection layer 3 and the magnetization of the spin injection layer 6 are in an almost parallel state as indicated by arrows 13' and 14', respectively. In this state, if a current is passed from the spin injection layer 6 to the oscillation layer 4 and the thermal spin injection layer 3 in a direction in which electrons flow in the direction of an arrow 12', even when the direction of the gap magnetic field is reversed, spin torque from the spin injection layer 6 and the thermal spin injection layer 3 is applied in a direction in which magnetization oscillation of the oscillation layer 4 is assisted. The oscillation layer 4 oscillates by receiving, from the spin injection layer 6, the spin torque which acts in a rotary direction as indicated by an arrow 15'.

Figure 4:
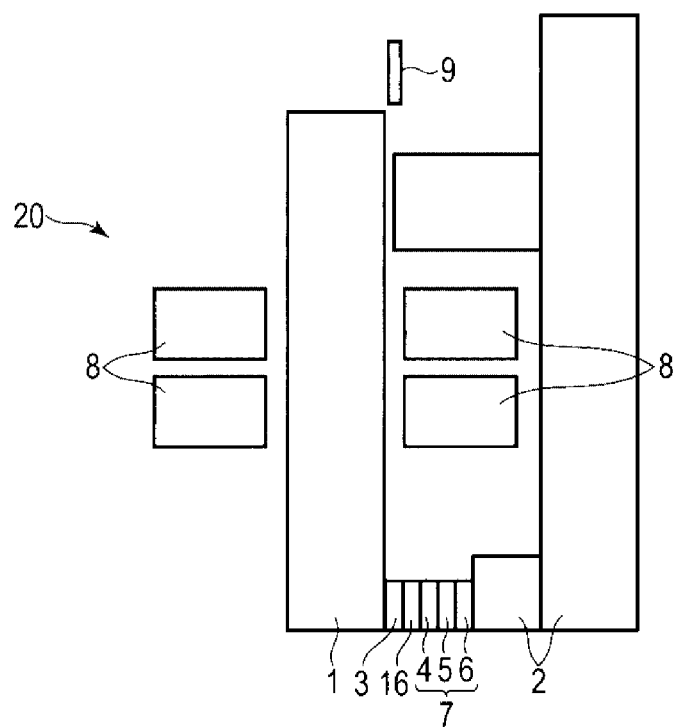
FIG. 4 is a cross-sectional view of a microwave assisted magnetic recording head according to a second embodiment.

FIG. 4 is a cross-sectional view of a microwave-assisted magnetic recording head according to a second embodiment.

As depicted in FIG. 4, a microwave-assisted magnetic recording head 20 has a configuration similar to the configuration of the microwave-assisted magnetic recording head 10 depicted in FIG. 1 except that the microwave-assisted magnetic recording head 20 includes a heater 9 near the main magnetic pole 1.

By the heater 9, a temperature difference of about a few K can be provided between the oscillation layer 4 and the main magnetic pole 1.

Figure 5:
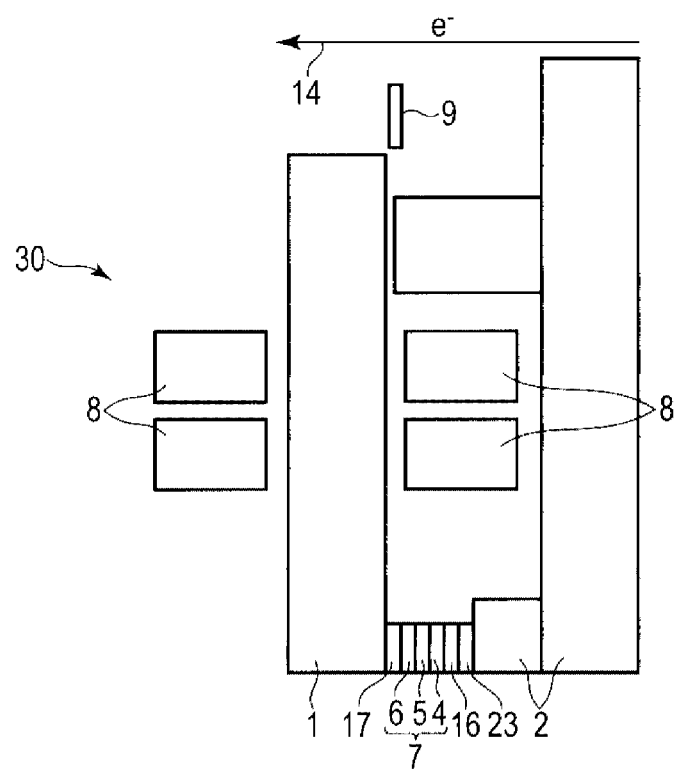
FIG. 5 is a cross-sectional view of a microwave assisted magnetic recording head according to a third embodiment.

FIG. 5 is a cross-sectional view of a microwave-assisted magnetic recording head according to a third embodiment.

As depicted in FIG. 5, a microwave-assisted magnetic recording head 30 includes a main magnetic pole 1 that generates a write magnetic field when a current is passed through a recording coil 8, an auxiliary magnetic pole 2 that is provided so as to face the main magnetic pole 1, a spin-torque oscillator 7 that is provided between the main magnetic pole 1 and the auxiliary magnetic pole 2, and a thermal spin injection layer 13 that is provided between the spin-torque oscillator 7 and the auxiliary magnetic pole 2 and is exchange-coupled to the auxiliary magnetic pole 2.

The spin-torque oscillator 7 has a spin injection layer 6 that includes a non-magnetic under layer 17, which is formed on the trailing direction side of the main magnetic pole 1, sandwiched between the spin injection layer 6 and the trailing direction side of the main magnetic pole 1, a first intermediate layer 5 provided on the spin injection layer 6, and an oscillation layer 4 provided on the first intermediate layer 5. Moreover, between the oscillation layer 4 and the thermal spin injection layer 23, a second intermediate layer 16 is provided. The thermal spin injection layer 23 is formed of a material of which spin-dependent Seebeck coefficient is negative and can inject thermal spin into the oscillation layer by a temperature difference between the thermal spin injection layer 23 and the oscillation layer 4.

If a current is passed from the thermal spin injection layer 23 to the oscillation layer 4 and the spin injection layer 6 in a direction in which electrons flow in a direction indicated by an arrow 14, the oscillation layer 4 oscillates by receiving spin torque from the spin injection layer 6. Furthermore, if there is a temperature difference between the oscillation layer 4 and the auxiliary magnetic pole 2, spin torque is injected into the oscillation layer 4 from the thermal spin injection layer 23, whereby magnetization oscillation of the oscillation layer 4 can be assisted.

As the non-magnetic under layer 17, for example, a stacking structure formed of an amorphous material such as Ta and a non-magnetic material layer containing any one of Cu, Ti, Pt, and W can be used.

Figure 6:
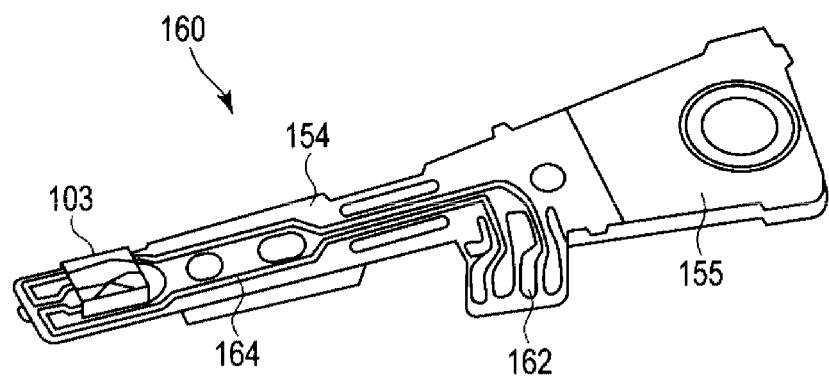
FIG. 6 depicts an example of a magnetic head assembly according to a fourth embodiment.

FIG. 6 depicts an example of a magnetic head assembly according to a fourth embodiment.

Figure 7:
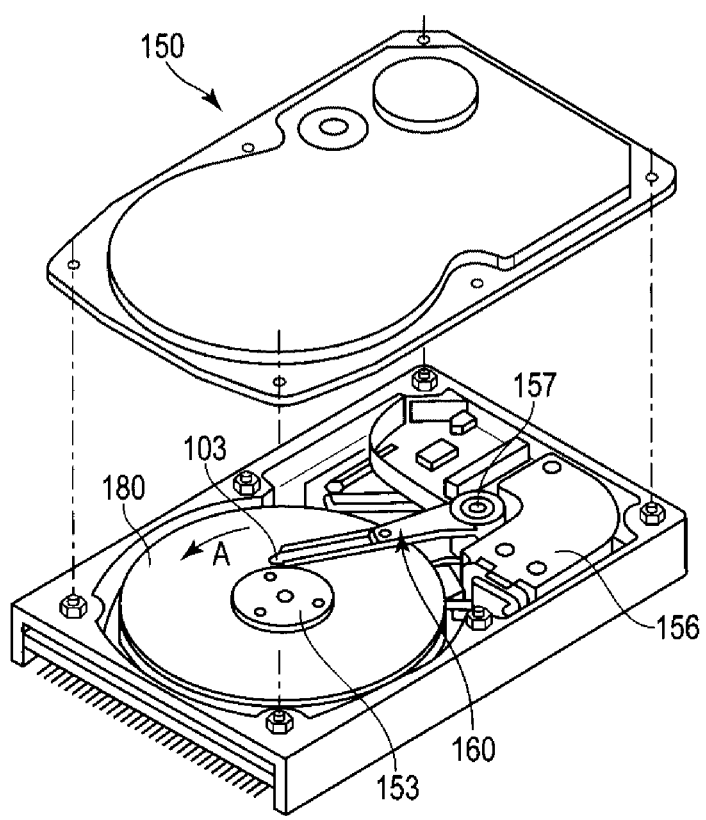
FIG. 7 depicts a configuration of a magnetic recording and reproducing device according to a fifth embodiment.

FIG. 7 depicts a configuration of a magnetic recording and reproducing device according to a fifth embodiment.

FIG. 7 is a schematic perspective view of a main portion of the magnetic recording and reproducing device on which the magnetic head according to the above embodiments can be mounted.

That is, a magnetic recording and reproducing device 150 is a device using a rotary actuator. In FIG. 7, a medium disk 180 for recording is put on a spindle 153 and rotates in a direction of an arrow A by a motor (not shown in FIG. 7) in response to a control signal from a drive device control unit (not shown in FIG. 7). The magnetic recording and reproducing device 150 may include a plurality of medium disks 180.

A head slider 103 that records and reproduces information stored in the medium disk 180 is attached to the tip of a thin-film-shaped suspension 154 in a magnetic head assembly 160 (See FIG. 5). Here, the head slider 103 has the magnetic head according to the embodiment, which is mounted near the tip of the head slider 103.

When the medium disk 180 rotates, a medium-facing surface (ABS) of the head slider 103 is held at a predetermined flying height from the surface of the medium disk 180. Alternatively, the slider may be a so-called "contact traveling-type" slider that makes contact with the medium disk 180.

The suspension 154 is connected to one end of an actuator arm 155 having, for example, a bobbin portion that holds an unillustrated drive coil. At the other end of the actuator arm 155, a voice coil motor 156, which is a type of linear motor, is provided. The voice coil motor 156 is composed of the unillustrated drive coil wound around the bobbin portion of the actuator arm 155 and a magnetic circuit formed of a permanent magnet and a counter yoke which are placed so as to face each other with this coil sandwiched therebetween.

The actuator arm 155 is held by unillustrated ball bearings provided in upper and lower two places of a spindle 157 and is configured to be turnably slid by the voice coil motor 156.

FIG. 6 schematically illustrates an example of a magnetic head assembly according to the fourth embodiment.

FIG. 6 is an enlarged perspective view of a part of the magnetic head assembly 160, including the actuator arm 155 and a portion closer to the tip of the magnetic head assembly 160, which is viewed from the side where the disk is located. That is, the magnetic head assembly 160 includes the actuator arm 155 having, for example, a bobbin portion that holds a drive coil, and, to one end of the actuator arm 155, the suspension 154 is connected.

To the tip of the suspension 154, the head slider 103 on which the magnetic head 10 depicted in FIG. 1 is mounted is attached. The suspension 154 has a lead wire 164 for writing and reading of a signal, and the lead wire 164 and each electrode of the magnetic head incorporated into the head slider 103 are electrically connected. In FIG. 6, 162 denotes an electrode pad of the magnetic head assembly 160.

EXAMPLES

Example 1

A method for producing the microwave-assisted magnetic recording head according to the first embodiment, the microwave-assisted magnetic recording head having the structure similar to the structure of FIG. 1, will be described below.

First, on a main magnetic pole, layers formed of the following materials and having the following thicknesses were stacked in order by using DC magnetron sputtering.

Thermal spin injection layer $Co_2FeAl$ 2 nm
non-magnetic layer Cu 2 nm
Oscillation layer FeCo 13 nm
non-magnetic layer Cu 3 nm
Spin injection layer FeCo 0.4 nm/[Co 0.2 nm/Ni 0.6 nm]×15
Non-magnetic cap layer Cu 1 nm/Ta 2 nm/Ru 15 nm A mask layer for defining the size of a spin-torque oscillator in a stripe height direction was formed, and etching was then performed to the non-magnetic layer (Cu 2 nm) of the spin-torque oscillator by ion beam etching (IBE). A SiOx insulating film was formed around elements, and the mask layer was then removed. Thereafter, a mask layer for defining the size in a track width direction was formed and similar processing was performed.

Next, on the non-magnetic cap layer, Ta 2 nm/FeCoNi was formed as an auxiliary magnetic pole.

Comparative Example 1

As Comparative Example 1, on a main magnetic pole, layers formed of the following materials and having the following thicknesses were stacked in order by using DC magnetron sputtering.
Under layer Ta 2 nm
Under layer Cu 2 nm
Oscillation layer FeCo 13 nm
Intermediate layer Cu 3 nm
Spin injection layer FeCo 0.4 nm/[Co 0.2 nm/Ni 0.6 nm]×15
Non-magnetic cap layer Cu 1 nm/Ta 2 nm/Ru 15 nm Then, processing was performed in similar manner, and an auxiliary magnetic pole was formed. Current densities necessary for oscillation were determined and a comparison was made therebetween, which revealed that the current density was $0.8 \times 10^8$ A/cm$^2$ in Example 1 and $0.75 \times 10^8$ A/cm$^2$ in Comparative Example 1.

In the configuration of Comparative Example 1, spin torque N1 in a direction in which oscillation is prevented is applied to the oscillation layer from the main magnetic pole.

On the other hand, in Example 1, spin torque N2 that is generated by a heat gradient is applied in a direction in which oscillation is assisted. The ratio of the spin torque N2 to the spin torque N1 is considered to be expressed by the following expression (1).

$$N2/N1 = P'S\Delta T/P\Delta V \qquad (1)$$

In the expression (1), $\Delta T$ is a temperature difference, $\Delta V$ is a voltage difference, and P is defined as the spin polarizability of conduction electrons. In Comparative Example 1, $P\Delta V$ is considered to be about 1 mV. On the other hand, P' is defined as a spin polarization factor of a Seebeck coefficient and S is defined as a Seebeck coefficient. According to a report, in the case of $Co_2FeAl$, P'S is about 35 μV/K. As described above, if a temperature gradient of about a few K is provided, the use of the magnetic recording head according to Example 1 allows the oscillation layer to cause magnetization oscillation at a lower current density than in a case where the magnetic recording head according to Comparative Example 1 is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A microwave-assisted magnetic recording head comprising:
   a main magnetic pole;
   an auxiliary magnetic pole facing the main magnetic pole with a gap therebetween; and
   a stacked-layer element disposed in the gap, and including, in the order from the main magnetic pole to the auxiliary magnetic pole,
      a thermal spin injection layer that is formed on the main magnetic pole, exchange-coupled with the main magnetic pole, and formed of a magnetic material of which spin-dependent Seebeck coefficient is negative,
      a first non-magnetic layer formed on the thermal spin injection layer,
      an oscillation layer formed on the first non-magnetic layer,
      a second non-magnetic layer formed on the oscillation layer, and
      a spin injection layer formed on the second non-magnetic layer.

2. The microwave-assisted magnetic recording head according to claim 1, wherein
   the stacked-layer element further includes a non-magnetic cap layer between the spin injection layer and the auxiliary magnetic pole.

3. The microwave-assisted magnetic recording head according to claim 1, wherein
   the thermal spin injection layer is formed of a cobalt-based Heusler alloy.

4. The microwave-assisted magnetic recording head according to claim 1, wherein
   the thermal spin injection layer has a positive perpendicular magnetic anisotropy.

5. The microwave-assisted magnetic recording head according to claim 1, further comprising:
   a heater positioned to heat the main magnetic pole and cause a temperature difference between the thermal spin injection layer and the oscillation layer.

6. The microwave-assisted magnetic recording head according to claim 1, wherein
   when the head is operated for data recording, a current is flowed from the auxiliary magnetic pole through the stacked-layer element to the main magnetic pole.

7. The microwave-assisted magnetic recording head according to claim 6, wherein
   when the head is operated for data recording, a magnetic flux extending from the main magnetic pole to the auxiliary magnetic pole is generated.

8. The high-frequency-assisted magnetic recording head according to claim 6, wherein
   when the head is operated for data recording, a magnetic flux extending from the auxiliary magnetic pole to the main magnetic pole is generated.

9. A microwave-assisted magnetic recording head comprising:
   a main magnetic pole;
   an auxiliary magnetic pole facing the main magnetic pole with a gap therebetween; and
   a stacked-layer element disposed in the gap, and including, in the order from the auxiliary magnetic pole to the main magnetic pole,
      a thermal spin injection layer that is formed on the auxiliary magnetic pole, exchange-coupled with the auxiliary magnetic pole, and formed of a magnetic material of which spin-dependent Seebeck coefficient is negative, a first non-magnetic layer formed on the thermal spin injection layer, an oscillation layer formed on the first non-magnetic layer, a second non-magnetic layer formed on the oscillation layer, and a spin injection layer formed on the second non-magnetic layer.

10. The microwave-assisted magnetic recording head according to claim 9, wherein the stacked-layer element further includes a non-magnetic under layer between the spin injection layer and the main magnetic pole.

11. The microwave-assisted magnetic recording head according to claim 9, wherein the thermal spin injection layer is formed of a cobalt-based Heusler alloy.

12. The microwave-assisted magnetic recording head according to claim 9, wherein the thermal spin injection layer has positive perpendicular magnetic anisotropy.

13. The microwave-assisted magnetic recording head according to claim 9, further comprising:

a heater positioned to heat the auxiliary magnetic pole and cause temperature difference between the thermal spin injection layer and the oscillation layer.

14. The microwave-assisted magnetic recording head according to claim 9, wherein when the head is operated for data recording a current is flowed from the main magnetic pole through the stacked-layer element to the auxiliary magnetic pole.

15. The microwave-assisted magnetic recording head according to claim 14, wherein when the head is operated for data recording, a magnetic flux extending from the main magnetic pole to the auxiliary magnetic pole is generated.

16. The high-frequency-assisted magnetic recording head according to claim 14, wherein when the head is operated for data recording, a magnetic flux extending from the auxiliary magnetic pole to the main magnetic pole is generated.

17. A magnetic disk device comprising:

a rotatable disk including a magnetic recording layer; and
a magnetic recording head including
    a main magnetic pole,
    an auxiliary magnetic pole facing the main magnetic pole with a gap therebetween, and
    a stacked-layer element disposed in the gap, and including, in the order from the main magnetic pole to the auxiliary magnetic pole,
        a thermal spin injection layer that is formed on the main magnetic pole, exchange-coupled with the main magnetic pole, and formed of a magnetic material of which spin-dependent Seebeck coefficient is negative,
        a first non-magnetic layer formed on the thermal spin injection layer,
        an oscillation layer formed on the first non-magnetic layer,
        a second non-magnetic layer formed on the oscillation layer, and
        a spin injection layer formed on the second non-magnetic layer.

18. The magnetic disk device according to claim 17, wherein when the magnetic recording head is operated for data recording, a current is flowed from the auxiliary magnetic pole through the stacked-layer element to the main magnetic pole.

19. The magnetic disk device according to claim 18, wherein when the magnetic recording head is operated for data recording, a magnetic flux extending from the main magnetic pole to the auxiliary magnetic pole is generated.

20. The magnetic disk device according to claim 18, wherein when the magnetic recording head is operated for data recording, a magnetic flux extending from the auxiliary magnetic pole to the main magnetic pole is generated.

* * * * *